May 18, 1948. A. E. DENTLER 2,441,621
FRICTION SHOCK ABSORBER
Filed March 11, 1946

Inventor:
Arnold E. Dentler.
By Henry Fuchs.
Atty.

UNITED STATES PATENT OFFICE 2,441,621

FRICTION SHOCK ABSORBER

Arnold E. Dentler, La Grange, Ill., assignor to W. H. Miner, Inc., Chicago, Ill., a corporation of Delaware Application March 11, 1946, Serial No. 653,652

16 Claims. (Cl. 267—9)

This invention relates to improvements in friction shock absorbers, especially adapted for snubbing the action of truck springs of railways cars.

One object of the invention is to provide a friction shock absorber of the character indicated comprising a friction member, a pair of friction elements having movement lengthwise with respect to said member, and spring means opposing relative movement of said elements and member toward each other, wherein the friction member and elements have lengthwise extending, interengaging friction surfaces and the friction elements are forced into tight frictional contact with said member by torsional spring means reacting between said elements tending to rotate the latter with respect to each other.

Another object of the invention is to provide a friction shock absorber comprising a friction casing, a pair of friction elements slidingly telescoped within the casing, spring means yieldingly opposing lengthwise movement of the friction elements inwardly of the casing, and torsional spring means anchored to said friction elements respectively and tending to rotate the same with respect to each other to hold said elements in tight frictional contact with the friction member.

A more specific object of the invention is to provide a shock absorber as set forth in the preceding paragraph, wherein the casing and friction elements are provided with interengaging friction surfaces of such formation as to restrict said casing and elements to movement in lengthwise direction with respect to each other and present engaging faces which are pressed against each other by the action of the torsional spring means.

Other objects of the invention will more clearly appear from the description and claims hereinafter following.

Figure 1:
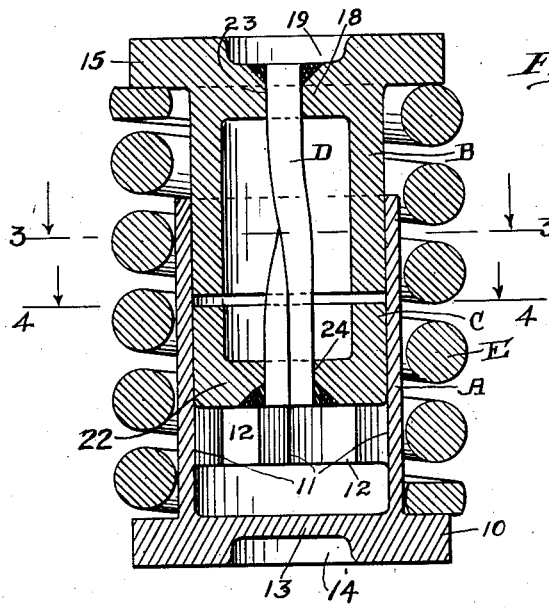
Figure 2:
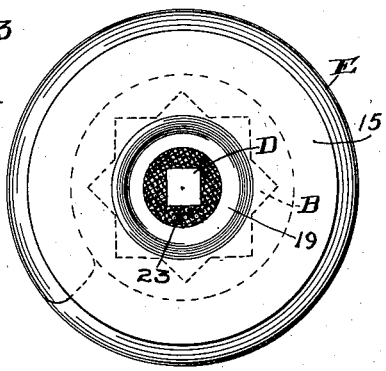
Figure 3:
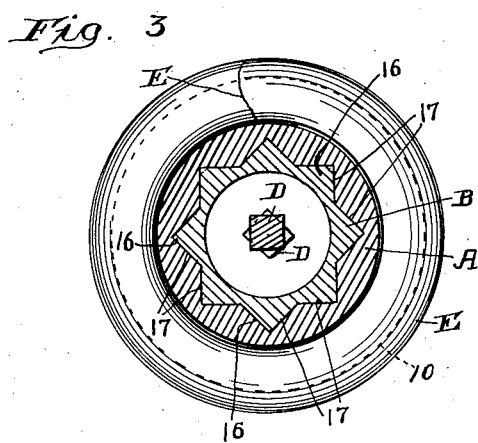
Figure 5:
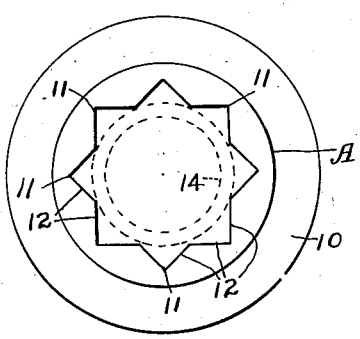
Figure 4:
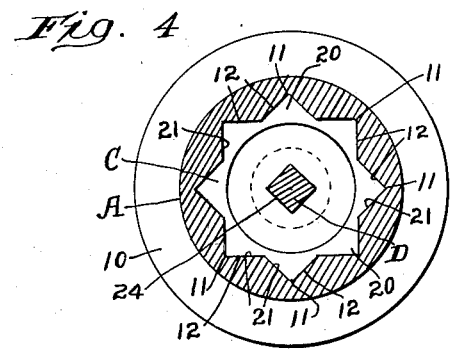

In the drawing forming a part of this specification, Figure 1 is a central, longitudinal, vertical sectional view of my improved shock absorber. Figure 2 is a top plan view of Figure 1. Figure 3 is a horizontal sectional view, corresponding substantially to the line 3—3 of Figure 1. Figure 4 is a horizontal sectional view, corresponding substantially to the line 4—4 of Figure 1, with the spring means which opposes relative movement omitted. Figure 5 is a top plan view of the friction shell or casing of my improved shock absorber.

Referring to the drawing, my improved shock absorber comprises broadly a casing A; a set of two friction elements B and C forming a two piece plunger telescoped within the casing; a torsional spring bar D reacting between the friction elements; and a spring resistance E yieldingly opposing relative movement of the two friction elements toward the casing.

The friction casing A is in the form of a cylindrical, tubular member having an annular, laterally outwardly projecting flange 10 at its lower end forming, in effect, a follower member. The casing A is open at the top and the interior wall of said casing is provided with a series of longitudinally extending, annularly arranged, grooves 11 of V-shaped, transverse cross section. The grooves 11 being arranged in annular series, the casing thus presents an interior contour of star-shaped, transverse cross section. The side walls of each groove 11 provide opposed, longitudinally extending, substantially flat friction surfaces 12—12. The bottom of the casing is closed by a transverse wall 13, which is provided with a downwardly opening seat 14 adapted to receive the spring centering projection of the lower spring follower plate of the truck spring cluster.

The friction element B is in the form of a tubular shell having a laterally projecting, annular flange 15 at its top end corresponding in diameter to the follower formed by the flange 10 of the casing A, and forms, in effect, a follower flange member. The shell B is open at the bottom end and is provided with a plurality of longitudinally extending, exterior ribs 16—16 of V-shaped, transverse cross section on the exterior thereof. The ribs 16—16 correspond in number to the grooves 11—11 of the casing A and slidingly interfit therewith. The sides of each V-shaped rib 16 present two longitudinally extending, flat friction surfaces 17—17, which engage the surfaces 12—12 of the corresponding groove 11 of the casing A. The upper end of the shell is closed by a transverse wall 18 provided with an upwardly opening seat 19 which receives the spring centering projection of the top spring plate of the truck spring cluster.

The friction element C is also in the form of a tubular shell and is of the same diameter as the shell portion of the element B and is provided with lengthwise extending ribs 20—20 of V-shaped, transverse cross section, similar to the ribs 16—16 of the element B and corresponding in number to the ribs 16. The ribs 20 also interfit with the grooves 11 of the casing A and present longitudinally extending, flat friction surfaces 21—21 on opposite sides thereof engaging the opposed surfaces 12—12 of the grooves 11. The bottom end of the shell-like element C is closed by a transverse wall 22, the element C thus presenting a cup-shaped formation. As shown most clearly in Figure 1, the element C is disposed below the element B in slightly spaced relation thereto and is connected to the latter by the torsion spring bar D, which is preferably of square cross section. The spring bar D is fixed to the elements B and C respectively, having its upper and lower ends welded thereto, the upper end of said bar being seated in a square opening 23 in the wall 18 of the element B and the lower end being seated in a square opening 24 provided in the bottom wall 22 of the element C. The elements B and C together form a plunger which is telescoped within the casing A with the ribs of the elements B and C engaged within the grooves of the casing, the element C being turned about the longitudinal central axis of the mechanism with respect to the element B to twist the bar D, as shown in Figures 1 and 3, and place said bar under tension. As will be evident, the torsional spring bar thus reacts between the elements B and C, tending to turn these elements in opposite directions with respect to each other, thus forcing the surfaces of the ribs of these elements into tight frictional contact with the friction surfaces presented by the grooves 11 of the casing A.

The spring E is in the form of a heavy helical coil surrounding the casing A and the shell portion of the element B and having its top and bottom ends bearing respectively on the flange 15 of the element B and the flange 10 of the casing A.

My improved shock absorber is substituted for one or more of the coil spring units of a cluster of truck springs, the same being interposed between the top and bottom spring follower plates of said cluster.

The operation of the improved shock absorber is as follows: Upon the spring cluster of the railway car truck being compressed between the top and bottom spring follower plates, the two piece plunger formed by the friction elements B and C is moved downwardly, lengthwise with respect to the casing A, against the resistance of the spring E. The desired snubbing action is thus produced during compression of the device by sliding frictional contact between the friction surfaces of the V-shaped ribs of the elements B and C and the friction surfaces of the grooves of the casing A, these friction surfaces being held in tight contact by the torsional action of the spring D, which tends to turn the elements B and C in reverse directions with respect to each other. The frictional resistance produced is substantially constant throughout the compression and recoil strokes of the device. During recoil of the truck springs, expansion of the spring E returns all of the parts of the shock absorber to the normal position shown in Figure 1. As will be evident, the frictional resistance provided between the friction elements and the casing being constant during all phases of operation of the shock absorber, the same amount of frictional resistance to snub the action of the truck springs is produced during both compression and recoil of the truck springs.

From the preceding description taken in connection with the drawing, it will be evident that, although the casing and friction elements have been shown and described as provided with interengaging grooves and ribs, similar results may be obtained by employing a casing of square or rectangular interior cross section and a correspondingly shaped two-piece plunger comprising a pair of friction elements, which are held in frictional contact with the casing by a torsional spring which reacts between said elements to turn the same in reverse directions. In fact, the same results may be obtained by providing the casing with an opening of non-circular contour and forming the friction elements of similar exterior contour to fit the casing and be thus restrained from rotation with respect to the casing.

I claim:

1. In a friction shock absorber, the combination with a friction member; of a set of two friction elements, said elements being telescoped with said member for lengthwise sliding movement with respect thereto, said member and each of said elements having interfitting guide portions extending lengthwise thereof and limiting said elements to lengthwise movement with respect to said member, said interfitting guide portions presenting lengthwise extending, cooperating friction surfaces; torsional spring means reacting between said elements tending to rotate one of said elements with respect to the other and press the friction surfaces thereof into tight frictional contact with the friction surfaces of said member; and spring means yieldingly opposing relative movement of said elements and member toward each other.

2. In a friction shock absorber, the combination with a friction member; of a set of two friction elements concentric with said member and telescoped with the same for movement with respect thereto lengthwise of the mechanism, said member and each of said elements having interfitting guide portions extending lengthwise thereof and limiting said elements to lengthwise movement with respect to said member, said interfitting guide portions presenting lengthwise extending, cooperating friction surfaces; a torsional spring bar anchoring one of said elements to the other for movement in unison lengthwise of the mechanism, said spring bar being under torsional stress and tending to rotate one of said elements with respect to the other and press the friction surfaces thereof into tight frictional contact with the friction surfaces of said member; and spring means yieldingly opposing relative movement of said elements and member toward each other.

3. In a friction shock absorber, the combination with a friction casing; of a two part friction plunger telescoped within said casing for lengthwise movement, said casing and each of said parts of the plunger having interfitting guide portions extending lengthwise thereof and limiting said parts of the plunger to lengthwise movement with respect to the casing, said interfitting guide portions presenting lengthwise extending, cooperating friction surfaces; torsional spring means reacting between said parts of said plunger tending to rotate one part with respect to the other and press the friction surfaces thereof into tight frictional contact with the friction surfaces of said casing; and spring means yieldingly opposing relative movement of said plunger and casing toward each other.

4. In a friction shock absorber, the combination with a friction casing; of a two part, transversely divided friction plunger slidingly telescoped within the friction casing for lengthwise movement, said casing and each of said parts of the plunger having interfitting guide portions extending lengthwise thereof and restricting said parts of the plunger to lengthwise movement with respect to said casing, said interfitting portions presenting lengthwise extending, cooperating friction surfaces; torsional spring means reacting between said parts of the plunger tending to rotate one of said parts with respect to the other and press the friction surfaces thereof into tight frictional contact with the friction surfaces of said casing; and spring means yieldingly opposing relative movement of said plunger and casing toward each other.

5. In a friction shock absorber, the combination with a friction casing; of a two part plunger, divided transversely into inner and outer friction elements, slidingly telescoped within said friction casing for lengthwise movement, said casing and each of said elements having interfitting guide portions extending lengthwise thereof and restricting said elements to lengthwise movement with respect to the casing, said interfitting portions presenting lengthwise extending, cooperating friction surfaces; torsional spring means anchoring said elements to each other for lengthwise movement in unison and reacting between said elements tending to rotate one of said elements with respect to the other and press the friction surfaces thereof into tight frictional contact with the friction surfaces of the casing; and spring means yieldingly opposing relative movement of said plunger and casing toward each other.

6. In a friction shock absorber, the combination with a friction casing having interior, lengthwise extending guide grooves presenting lengthwise extending friction surfaces; of a two-part plunger telescoped within the casing for lengthwise movement, each of said parts of the plunger having guide projections extending lengthwise thereof interfitting with said guide grooves, said projections presenting lengthwise extending friction surfaces engaging the friction surfaces of said casing; torsional spring means reacting between said parts of the plunger tending to rotate one part with respect to the other and press the friction surfaces thereof into tight frictional contact with the friction surfaces of said casing; and spring means yieldingly opposing relative movement of said plunger and casing toward each other.

7. In a friction shock absorber, the combination with a friction casing having interior, lengthwise extending guideways of V-shaped, transverse cross section presenting friction surfaces; of a two part, transversely divided plunger slidingly telescoped within the friction casing for lengthwise movement, said parts of the plunger having lengthwise extending guide projections of V-shaped, transverse cross section interfitting with said guide grooves and presenting friction surfaces engaging the friction surfaces of said grooves; torsional spring means reacting between said parts of the plunger tending to rotate one of said parts with respect to the other and press the friction surfaces thereof into tight frictional contact with the friction surfaces of said casing; and spring means yieldingly opposing relative movement of said plunger and casing toward each other.

8. In a friction shock absorber, the combination with a friction casing of star-shaped, transverse, interior cross section, presenting flat, lengthwise extending, interior friction surfaces; of a two part plunger divided transversely into inner and outer friction elements, said friction elements being of an exterior, transverse, cross sectional contour to slidingly telescope within said casing in interfitting relation, said friction elements presenting friction surfaces cooperating with the friction surfaces of the casing; torsional spring means anchoring said elements to each other for lengthwise movement in unison and reacting between said elements tending to rotate one of said elements with respect to the other and press the friction surfaces thereof into tight frictional contact with the friction surfaces of the casing; and spring means yieldingly opposing relative movement of said plunger and casing toward each other.

9. In a friction shock absorber, the combination with a friction member; of a set of two friction elements, said elements being telescoped with said member for lengthwise sliding movement with respect thereto, said member and each of said elements having interfitting guide portions extending lengthwise thereof and limiting said elements to lengthwise movement with respect to said member, said interfitting guide portions presenting lengthwise extending, cooperating friction surfaces; torsional spring means comprising an elongated spring bar, said bar having its opposite ends rigidly fixed to said elements respectively between said elements tending to rotate one of said elements with respect to the other and press the friction surfaces thereof into tight frictional contact with the friction surfaces of said member; and spring means yieldingly opposing relative movement of said elements and member toward each other.

10. In a friction shock absorber, the combination with a friction member; of a set of two friction elements concentric with said member and telescoped with the same for movement with respect thereto lengthwise of the mechanism, said member and each of said elements having interfitting guide portions extending lengthwise thereof and limiting said elements to lengthwise movement with respect to said member, said interfitting guide portions presenting lengthwise extending, cooperating friction surfaces; a torsional spring bar having its opposite ends rigidly connected to said elements respectively anchoring one of said elements to the other for movement in unison lengthwise of the mechanism, said spring bar being under torsional stress and tending to rotate one of said elements with respect to the other and press the friction surfaces thereof into tight frictional contact with the friction surfaces of said member; and spring means yieldingly opposing relative movement of said elements and member toward each other.

11. In a friction shock absorber, the combination with a friction casing; of a two part friction plunger telescoped within said casing for lengthwise movement, said casing and each of said parts of the plunger having interfitting guide portions extending lengthwise thereof and limiting said parts of the plunger to lengthwise movement with respect to the casing, said interfitting guide portions presenting lengthwise extending, cooperating friction surfaces; a torsional spring bar having its opposite ends rigidly anchored to said parts of the plunger respectively and reacting between said parts of said plunger tending to rotate one part with respect to the other and press the friction surfaces thereof into tight frictional contact with the friction surfaces of said casing; and spring means yieldingly opposing relative movement of said plunger and casing toward each other.

12. In a friction shock absorber, the combination with a friction casing; of a two part, transversely divided friction plunger slidingly telescoped within the friction casing for lengthwise movement, said casing and each of said parts of the plunger having interfitting guide portions extending lengthwise thereof and restricting said parts of the plunger to lengthwise movement with respect to said casing, said interfitting portions presenting lengthwise extending, cooperating friction surfaces; a torsional spring bar having its opposite ends rigidly secured to said parts of the plunger respectively and reacting between said parts of the plunger tending to rotate one of said parts with respect to the other and press the friction surfaces thereof into tight frictional contact with the friction surfaces of said casing; and spring means yieldingly opposing relative movement of said plunger and casing toward each other.

13. In a friction shock absorber, the combination with a friction casing; of a two part plunger, divided transversely into inner and outer friction elements, slidingly telescoped within said friction casing for lengthwise movement, said casing and each of said elements having interfitting guide portions extending lengthwise thereof and restricting said elements to lengthwise movement with respect to the casing, said interfitting portions presenting lengthwise extending, cooperating friction surfaces; a spring bar having its opposite ends rigidly secured to said elements respectively, said bar being twisted to tension the same and reacting between said elements tending to rotate one of said elements with respect to the other and press the friction surfaces thereof into tight frictional contact with the friction surfaces of the casing; and spring means yieldingly opposing relative movement of said plunger and casing toward each other.

14. In a friction shock absorber, the combination with a friction casing having interior, lengthwise extending guide grooves presenting lengthwise extending friction surfaces; of a two part plunger telescoped within the casing for lengthwise movement, each of said parts of the plunger having guide projections extending lengthwise thereof interfitting with said guide grooves, said projections presenting lengthwise extending friction surfaces engaging the friction surfaces of said casing; a torsional spring bar having its opposite ends rigidly secured to said parts respectively and reacting between said parts of the plunger tending to rotate one part with respect to the other and press the friction surfaces thereof into tight frictional contact with the friction surfaces of said casing; and spring means yieldingly opposing relative movement of said plunger and casing toward each other.

15. In a friction shock absorber, the combination with a friction casing having interior, lengthwise extending guideways of V-shaped, transverse cross section presenting friction surfaces; of a two part, transversely divided plunger slidingly telescoped within the friction casing for lengthwise movement, said parts of the plunger having lengthwise extending guide projections of V-shaped, transverse cross section interfitting with said guide grooves and presenting friction surfaces engaging the friction surfaces of said grooves; a torsional spring bar having its opposite ends rigidly secured respectively to said parts of the plunger and reacting between said parts of the plunger tending to rotate one of said parts with respect to the other and press the friction surfaces thereof into tight frictional contact with the friction surfaces of said casing; and spring means yieldingly opposing relative movement of said plunger and casing toward each other.

16. In a friction shock absorber, the combination with a friction casing of star-shaped, transverse, interior cross section, presenting flat, lengthwise extending, interior friction surfaces; of a two part plunger divided transversely into inner and outer friction elements, said friction elements being of an exterior, transverse, cross sectional contour to slidingly telescope within said casing in interfitting relation, said friction elements presenting friction surfaces cooperating with the friction surfaces of the casing; a torsional spring bar having its opposite ends rigidly secured respectively to said elements and reacting between said elements tending to rotate one of said elements with respect to the other and press the friction surfaces thereof into tight frictional contact with the friction surfaces of the casing; and spring means yieldingly opposing relative movement of said plunger and casing toward each other.

ARNOLD E. DENTLER.